3,786,092
3-NITROPROPIONIC ACID DERIVATIVES
Gianluigi Soldati, Naugatuck, and Allen E. Smith, Bethany, Conn., assignors to Uniroyal, Inc., New York, N.Y.
No Drawing. Filed Apr. 14, 1969, Ser. No. 816,081
Int. Cl. C07c 103/30
U.S. Cl. 260—561 R    23 Claims

ABSTRACT OF THE DISCLOSURE

Novel 3-nitropropionic acid derivatives, namely 3-nitropropionamides and 3-nitropropionanilides, possess fungicidal, insecticidal, viricidal, and other activity.

DISCLOSURE

This invention relates to novel 3-nitropropionamides and 3-nitropropionanilides which possess fungicidal, insecticidal, viricidal, and other activity. The compounds of the invention may be represented by the following generic formula:

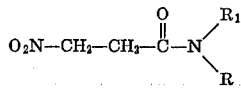

wherein R is hydrogen or alkyl; $R_1$ is selected from alkyl, cycloalkyl, aryl, aralkyl, and the substituted derivatives thereof wherein the substituent is independently selected from halo, alkyl, alkoxy, haloalkyl, nitro, cyano and dialkylamino. There may be one or more of such substituents and where there are two or more, they may be the same or different members of the foregoing group.

Examples of R are hydrogen and alkyl having 1 to 4 carbon atoms, such as methyl, ethyl, propyl (n- and iso-) and butyl (n-, iso-, sec- and tert-).

Examples of $R_1$ are alkyl having from 1 to 10 carbon atoms, such as methyl, ethyl, propyl, butyl (n-, iso-, sec-, and tert-), and amyl, hexyl, heptyl, nonyl and decyl; cycloalkyl, especially cycloalkyl having 5 and 6 ring carbon atoms, i.e. cyclopentyl and cyclohexyl; aryl, such as phenyl and such polycyclic aryl groups as naphthyl; and aralkyl, such as benzyl. Examples of the substituents which may be present where $R_1$ is a substituted radical are chloro, bromo, fluoro, methyl, ethyl, propyl (n- and iso-) butyl (n-, iso- and tert-), hexyl, decyl, methoxy, chloromethyl, trichloromethyl, nitro, cyano and dimethylamino.

Specifically, some further examples of $R_1$ are p-methylbenzyl, p-nitrobenzyl, 2,6-diethylphenyl, p-nitrophenyl, p-cyanophenyl, 4-chloro-α-naphthyl, m-bromophenyl, 2,4,6-trichlorophenyl, and 2,5,6-trichlorophenyl.

The 3-nitropropionic acid derivatives of this invention are formed readily in good yields by the reaction of 3-nitropropionylchloride with aliphatic or aromatic amines in suitable anhydrous solvents, such as acetonitrile or ether, for a period of time of two to four hours at temperatures ranging between 0° and 25° C. The 3-nitropropionylchloride reactant is obtained in almost quantitative yield by reacting 3-nitropropionic acid, prepared as described by T. L. Gresham, et al., Jour. Am. Chem. Soc., 74, 1323–1325 (1952), with an excess of thionyl chloride.

Illustrative examples of the 3-nitropropionic acid derivatives of this invention are:

| Compound: | Number in Table I below |
|---|---|
| 3-nitropropionanilide | 1 |
| 2'-chloro-3-nitropropionanilide | 2 |
| 3'-methyl-3-nitropropionanilide | 3 |
| 3',4'-dichloro-3-nitropropionanilide | 4 |
| 4'-methyl-3-nitropropionanilide | 5 |
| 2'-fluoro-3-nitropropionanilide | 6 |
| 3'-chloro-3-nitropropionanilide | 7 |
| 4'-chloro-2-nitropropionanilide | 8 |
| N-benzyl-3-nitropropionamide | 9 |
| 4'-methoxy-3-nitropropionanilide | 10 |
| N-(α-naphthyl)-3-nitropropionamide | 11 |
| 4'-fluoro-3-nitropropionanilide | 12 |
| 2'-methoxy-5'-nitro-3-nitropropionanilide | 13 |
| 3'-nitro-3-nitropropionanilide | 14 |
| 4'-dimethylamino-3-nitropropionanilide | 15 |
| 3' - (α,α,α, - trifluoromethyl) - 3-nitro-propionanilide | 16 |
| 2'-chloro-4'-nitro-3-nitropropionanilide | 17 |
| 2',4'-dimethyl-3-nitropropionanilide | 18 |
| 4'-bromo-3-nitropropionanilide | 19 |
| 2'-bromo-3-nitropropionanilide | 20 |
| N-cyclohexyl-3-nitropropionamide | 21 |
| 2',4'-dichloro-3-nitropropionanilide | 22 |
| 2'-methyl-4'-chloro-3-nitropropionanilide | 23 |
| N,N'-(di-n-butyl)-3-nitropropionamide | 24 |
| 2',5'-dimethoxy-3-nitropropionanilide | 25 |
| 2'-methyl-3-nitropropionanilide | 26 |
| N-methyl-3-nitropropionanilide | 27 |
| N-(o-chlorobenzyl)-3-nitropropionamide | 28 |
| N-(p-chlorobenzyl)-3-nitropropionamide | 29 |
| 2'-methyl-3'-chloro-3-nitropropionanilide | 30 |
| 3',4'-dimethyl-3-nitropropionanilide | 31 |
| 2',5'-dimethyl-3-nitropropionanilide | 32 |
| 2',4',5'-trichloro-3-nitropropionanilide | 33 |
| N,N-diethyl-3-nitropropionamide | 34 |
| N-isobutyl-3-nitropropionamide | 35 |
| N-(n-hexyl)-3-nitropropionamide | 36 |
| N-(n-decyl)-3-nitropropionamide | 37 |

Syntheses of the 3-nitropropionic acid derivatives of this invention are illustrated by the following examples.

Example I.—3-Nitropropionanilide

To a stirred solution of 33.8 g. (0.364 mole) of aniline in 300 ml. of anhydrous ether were added, dropwise and at about 0° C., 25 g. (0.18 mole) of 3-nitropropionylchloride. At the end of the addition stirring was continued for one hour at room temperature. A precipitate was formed, filtered, washed with water and the residue dried. Additional anilide was recovered on evaporation of the ethereal liquors. Recrystallization of the combined crude products from benzene-hexane yielded 26 g. of white crystalline material melting at 87–9° C.

Analysis.—Calcd. for $C_9H_{10}N_2O_3$ (percent): C, 55.67; H, 5.19; N, 14.43. Experimental (percent): C, 55.48; H, 5.36; N, 14.08.

Example II.—4'-Chloro-3-nitropropionanilide 3-nitropropionylchloride (25 g., 0.18 mole) was added dropwise to a stirred solution of p-chloroaniline (46 g., 0.362 mole) in 400 ml. of anhydrous ether at 10–15° C. After one hour the precipitate was filtered, slurried in water and the residue collected. Additional product was recovered from the ethereal solution. The combined residues (26.5 g.) recrystallized twice from methanol-water and benzene-hexane gave a white crystalline product melting at 117–8° C.

*Analysis.*—Calcd. for $C_9H_9ClN_2O_3$ (percent): C, 47.27; H, 3.97; N, 12.25. Experimental (percent): C, 47.46; H, 3.93; N, 12.06.

Example III.—N-isobutyl-3-nitropropionamide

To a cold stirred solution of isobutylamine (26.6 g., 0.362 mole) in 250 ml. of acetonitrile was added dropwise 3-nitropropionylchloride (25 g., 0.181 mole) dissolved in 25 ml. of acetonitrile. The inorganic salt formed was filtered off, the solution evaporated and the residue dissolved in benzene. The benzene solution was washed twice with diluted (1:10) hydrochloric acid, then water. The organic layer was dried over magnesium sulfate and decolorized. Evaporation of the solvent gave 20 g. of tan oil which was further purified by column chromatography.

*Analysis.*—Calcd. for $C_7H_{14}N_2O_3$ (percent): N, 16.08. Experimental (percent): N, 15.87–16.07.

Infrared spectra of all the 3-nitropropionamides in which R was H showed N—H amide absorption at M 2.9–3.0μ. All showed absorption at 6.45–6.5μ for the nitro group (asym. —$NO_2$).

The following table sets forth many of the novel compounds which are within the invention.

EXAMPLE IV

Fungicidal Activity (Early Blight and Bean Rust)

(1) Early blight (*Alternaria solani*) test: One gram of the chemical to be tested was ground with three ml. of acetone and 50 mg. of a non-ionic surface-active agent (Triton X–100 [1]). The acetone and surface-active agent are known to be inactive in the biological tests run. The mixture was diluted with water, giving suspensions containing 500 and 2000 p.p.m. of the chemical. These suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a controlled chamber at a temperature of 75° F. and 100% relative humidity. In the morning the plants were transferred to the greenhouse. Three days later the disease was scored by comparing the number of disease lesions of the treated plants with the untreated check plants.

The formula to determine percent control is:

$$100 - \left(\frac{\text{Avg. no. lesions on treated plant}}{\text{Avg. no. lesions on untreated plant}} \times 100\right) = \text{percent control}$$

TABLE I

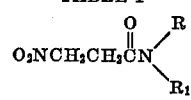

| Compound | $R_1$ (R is hydrogen unless otherwise indicated) | M.P./B.P. | Formula | Calculated C | Calculated H | Calculated N | Experimental C | Experimental H | Experimental N |
|---|---|---|---|---|---|---|---|---|---|
| 1 | Phenyl | 87–9° | $C_9H_{10}N_2O_3$ | 55.67 | 5.19 | 14.43 | 55.48 | 5.36 | 14.08 |
| 2 | o-Chlorophenyl | 90–1° | $C_9H_9ClN_2O_3$ | 47.27 | 3.97 | 12.25 | 47.88 | 3.81 | 12.05 |
| 3 | m-Tolyl | 83–5° | $C_{10}H_{12}N_2O_3$ | 57.69 | 5.81 | 13.45 | 57.57 | 5.62 | 13.92 |
| 4 | 3,4-dichlorophenyl | 107–9° | $C_9H_8Cl_2N_2O_3$ | 41.05 | 3.07 | 10.65 | 40.85 | 3.15 | 10.73 |
| 5 | p-Tolyl | 130–2° | $C_{10}H_{12}N_2O_3$ | 57.69 | 5.81 | 13.45 | 57.03 | 5.83 | 13.53 |
| 6 | o-Fluorophenyl | 89–91° | $C_9H_9FN_2O_3$ | | | | | | |
| 7 | m-Chlorophenyl | 128–30° | $C_9H_9ClN_2O_3$ | | | | | | |
| 8 | p-Chlorophenyl | 117–8° | $C_9H_9ClN_2O_3$ | 47.27 | 3.97 | 12.25 | 47.46 | 3.93 | 12.06 |
| 9 | Benzyl | 110–2° | $C_{10}H_{12}N_2O_3$ | 57.69 | 5.81 | 13.45 | 57.66 | 5.75 | 13.11 |
| 10 | p-Methoxyphenyl | 107–9° | $C_{10}H_{12}N_2O_4$ | 53.57 | 5.39 | 12.49 | 53.35 | 4.52 | 12.13 |
| 11 | α-naphthyl | 121–2° | $C_{13}H_{12}N_2O_3$ | 63.93 | 4.95 | 11.47 | 63.27 | 5.15 | 11.38 |
| 12 | p-Fluorophenyl | 94–5° | $C_9H_9FN_2O_3$ | | | | | | |
| 13 | 2-methoxy-5-nitrophenyl | 159–60° | $C_{10}H_{11}N_3O_6$ | 44.62 | 4.12 | 15.61 | 44.79 | 4.20 | 15.91 |
| 14 | 3-nitrophenyl | 128–9° | $C_9H_9N_3O_5$ | 45.19 | 3.79 | 17.57 | 45.82 | 4.00 | 17.26 |
| 15 | p-Dimethylaminophenyl | 159–61° | | | | | | | |
| 16 | α,α,α-trifluoro-m-tolyl | 93–5° | | | | | | | |
| 17 | 2-chloro-4-nitrophenyl | 124–5° | $C_9H_8ClN_3O_5$ | 38.63 | 2.95 | 15.36 | 40.39 | 2.80 | 15.19 |
| 18 | 2,4-xylyl | 110–2° | | | | | | | |
| 19 | p-Bromophenyl | 132–3° | $C_9H_9BrN_2O_3$ | 39.58 | 3.32 | 10.26 | 39.47 | 3.37 | 10.26 |
| 20 | o-Bromophenyl | 88–88.5° | $C_9H_9BrN_2O_3$ | 39.58 | 3.32 | 10.26 | 39.81 | 3.36 | 10.30 |
| 21 | Cyclohexyl | 89–91° | | | | | | | |
| 22 | 2,4-dichlorophenyl | 131° | $C_9H_8Cl_2N_2O_3$ | 41.05 | 3.07 | 10.65 | 41.32 | 2.83 | 10.47 |
| 23 | 4-chloro-o-tolyl | 121–2° | $C_{10}H_{11}ClN_2O_3$ | 49.48 | 4.57 | 11.54 | 49.28 | 4.59 | 11.25 |
| 24 | n-Butyl; (R=n-Butyl) | 1 84° | $C_{11}H_{22}N_2O_3$ | | | 12.16 | | | 12.11–12.25 |
| 25 | 2,5-dimethoxyphenyl | 132–3° | $C_{11}H_{14}N_2O_5$ | 51.97 | 5.55 | 11.02 | 52.27 | 5.69 | 11.32 |
| 26 | o-Tolyl | 102–102.5° | $C_{10}H_{12}N_2O_3$ | 57.69 | 5.81 | 13.45 | 58.27 | 5.81 | 13.31 |
| 27 | Phenyl; (R=Methyl) | (2) | $C_{10}H_{12}N_2O_3$ | | | | | | 13.19–13.43 |
| 28 | o-Chlorobenzyl | 100–1° | $C_{10}H_{11}ClN_2O_3$ | 49.48 | 4.57 | 11.54 | 49.62 | 4.78 | 11.15 |
| 29 | p-Chlorobenzyl | 106–7° | $C_{10}H_{11}ClN_2O_3$ | 49.48 | 4.57 | 11.54 | 49.38 | 4.63 | 11.16 |
| 30 | m-Chloro-o-tolyl | 130–2° | | | | | | | |
| 31 | 3,4-xylyl | 102° | $C_{11}H_{14}N_2O_3$ | 59.45 | 6.35 | 12.60 | 59.96 | 6.37 | 12.65 |
| 32 | 2,5-xylyl | 147–8° | $C_{11}H_{14}N_2O_3$ | 59.45 | 6.35 | | 60.00 | 6.32 | |
| 33 | 2,4,5-trichlorophenyl | 169–70° | $C_9H_7Cl_3N_2O_3$ | 36.33 | 2.37 | 9.42 | 36.90 | 2.59 | 9.24 |
| 34 | Ethyl; (R=Ethyl) | | $C_7H_{14}N_2O_3$ | | | 16.08 | | | 16.87–16.90 |
| 35 | i-Butyl | | $C_7H_{14}N_2O_3$ | | | 16.08 | | | 15.87–16.07 |
| 36 | n-Hexyl | | $C_9H_{18}N_2O_3$ | | | 13.85 | | | 14.16–14.40 |
| 37 | n-Decyl | 62–4° | $C_{13}H_{26}N_2O_3$ | 60.44 | 10.14 | 10.84 | 60.71 | 10.41 | 11.21 |

[1] 2 mm. decomposition.
[2] Decomposition.

The 3-nitropropionic acid derivatives described herein have shown fungicidal, insecticidal, viricidal and other biological activity, as shown by the following examples.

Checks: acetone and surface-active agent solution.

(2) Bean rust (*Uromyces phaseoli*) evaluation: Two

---
[1] Octyl phenoxy polyethoxy ethanol.

hundred milligrams of the chemical to be tested were dissolved in 20 ml. of acetone and 60 mg. of a surfactant such as Triton X–100.[1] This preparation was diluted with 80 ml. distilled water giving a chemical suspension of 2000 p.p.m. 500 p.p.m. suspensions were also prepared. The chemical suspensions were sprayed on duplicate pots, each containing two snapbean plants which had, 48 hours prior to this, been inoculated with bean rust *Uromyces phaseoli typica* Arth. The spray application was made with a gun-type sprayer delivering 2.5 ml. per second. At the time of the chemical spray the bean plants had just begun to expand their first trifoliate leaves. The test plants were then placed in a control chamber for 24 hours at 75° F. and 100% relative humidity. After this time the plants were returned to the greenhouse. About 10 days later the plants were scored for disease control.

The formula to determine percent control is:

$$100 - \left(\frac{\text{Avg. no. lesions on treated plant}}{\text{Avg. no. lesions on untreated plant}} \times 100\right) = \text{percent control}$$

Checks: acetone and Triton X–100 solution.

| Compound No. in Table I | Early blight, percent control | | Bean rust | |
|---|---|---|---|---|
| | 2,000 p.p.m. | 500 p.p.m. | 2,000 p.p.m. | 500 p.p.m. |
| 2 | 93 | 78 | | |
| 3 | 96 | 87 | | |
| 4 | 86 | 53 | | |
| 13 | 86 | 73 | | |
| 23 | 90 | 84 | | |
| 24 | 50 | 50 | 95 | 0 |
| 25 | 82 | 83 | | |
| 26 | 89 | 50 | 98 | 0 |
| 27 | 76 | 50 | 90 | 70 |
| 28 | 0 | 0 | 80 | 25 |
| 31 | 92 | 72 | | |
| 34 | 83 | 81 | | |

EXAMPLE V

Insecticidal activity

Mosquito larvae test (*Aedes Aegypti* 4th instar larvae).—The compound to be tested (10 mg.) is added to 1 ml. analytical reagent grade acetone and 100 ml. water to give a 100 p.p.m. solution, a 25 ml. aliquot of which was added to test tubes prior to the introduction therein of from 10 to 25 larvae. The tubes were maintained in darkness for 72 hours, at the end of which time the live and dead larvae were counted and the percent control as percentage killed was determined.

Checks using acetone at 1000 p.p.m. and 1% were conducted.

| Compound number in Table I | Percent control 100 p.p.m. |
|---|---|
| 4 | 100 |
| 19 | 70 |
| 20 | 73 |
| 22 | 97 |
| 25 | 72 |
| 33 | 47 |
| 37 | 84 |

The compounds of the invention also exhibit insecticidal activity with respect to Mexican bean beetle larvae.

EXAMPLE VI

Viricidal activity

Viricide test: Southern bean mosaic virus disease.—Pinto bean plants were inoculated with a virus preparation containing .01 g./ml. silicon carbide for minute wounding to introduce the virus into the cotyledonary leaves. Plants were held for 2–3 hours before spraying the chemical to allow for wound healing. Plants were sprayed to run off at two dosages, 2000 and 500 p.p.m. The plants were kept in a greenhouse environment at 75° F., 50% humidity. In 3–5 days local lesion infection sites appeared and the effectiveness of the chemical treatment was evaluated based on reduction in numbers of the local lesion infection sites. Checks: acetone-Triton X–100 solution.

| Compound | Percent control | |
|---|---|---|
| | 2,000 p.p.m. | 500 p.p.m. |
| 8 | 33 | 27 |
| 12 | 47 | 58 |
| 13 | 50 | 45 |
| 14 | 37 | 26 |
| 17 | 45 | 8 |
| 18 | 66 | 58 |
| 19 | 12 | 19 |
| 22 | 19 | 15 |

The chemicals also may be sprayed on cotyledonary leaves in the form of an aqueous solution containing 2% of a solvent for the chemical and an emulsifier, Triton X–100.

Additionally, certain of the compounds of the invention especially the halogenated 3 - nitropropionanilides, e.g. Compounds 8 and 19, show plant growth regulant properties by reducing terminal bud growth and stimulating axillary and growth on cowpeas, Black Valentine beans and apple seedlings.

The preferred compounds of the invention are the halogenated 3-nitropropionanilides (e.g., Compounds 2, 4, 9, 12, 19 and 33); the alkylated 3-nitropropionanilides (e.g., Compounds 3 and 18); as well as others, e.g., Compounds 13, 27 and 36.

It should be apparent to those in the art that the compounds of the invention, when used in the manner ordinarily employed by those taking advantage of the aforementioned activities, can and will be used in a variety of ways. Thus the compounds can be admixed with commonly used well-known solvents (xylene, iso-butyl alcohol, naphtha, kerosene, mesityl, oxide, etc.), suspension media (especially water) surfactants (non-ionic and ionic surfactants such as alkyl-aryl sulphonates, polyoxyethylene alkylphenols, polyoxyethylated esters of fatty acids, polyoxyethylated alcohols, etc.), carriers, extenders and diluents (talc, clay, attapulgite clay, pyrophyllite (Pyrax ABB) calcium silicate (Microcel E); they also can be combined with other compounds or commercial preparations which possess like properties, and certainly with each other; furthermore, these compounds can be applied via soil, seed of foliar treatment, or to locations where fungus, insect or virus activity is known or expected, and to crops such as cotton, beans, peas, tomatoes, peaches, apples and pears. The commercialization of the compounds of the invention may take the form of the distribution of highly concentrated mixtures of the active compound which are to be diluted or extended by the ultimate consumer prior to use. Typically such concentrates contain the active compound in amounts from 20 to 95 wt. percent of the total composition, the remainder being, e.g., solvent or suspension medium (e.g. water or other aqueous medium and surfactant, collectively commonly referred to as carrier material).

It is to be understood that those variations of the invention which are within the competence of those skilled in the art and which basically rely on the teachings described herein are considered to be within the scope of the description and appended claims.

What is claimed is:

1. A compound of the formula:

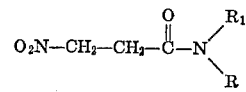

[1] Octyl phenoxy polyethoxy ethanol.

wherein (a) where R is hydrogen, $R_1$ is selected from the group consisting of alkyl having from 1 to 10 carbon atoms, cyclohexyl, naphthyl, benzyl, chlorobenzyl, and substituted phenyl having one to three substituents wherein up to two substituents are selected from halo and up to three substituents are selected from alkyl containing 1 to 10 carbon atoms, methoxy, dimethylamino, trifluoromethyl and nitro; or (b) where R is an alkyl group having from 1 to 4 carbon atoms, $R_1$ is selected from an alkyl group having 1 to 4 carbon atoms, and phenyl.

2. The compound 3′,4′-dichloro-3-nitropropionanilide.
3. The compound N-benzyl-3-nitropropionamide.
4. The compound 2′-methyl-4′-chloro-3-nitropropionanilide.
5. The compound 2′,4′-dimethyl-3-nitropropionanilide.
6. The compound 2′-methoxy-5′-nitro-3-nitropropionanilide.
7. The compound N-methyl-3-nitropropionanilide.
8. The compound N,N′-diethyl-3-nitropropionamide.
9. The compound N-(n-hexyl)-3-nitropropionamide.
10. N-(α-naphthyl)-3-nitropropionamide.
11. 2′-chloro-4′-nitro-3-nitropropionanilide.
12. N-cyclohexyl-3-nitropropionamide.
13. 2′,4′-dichloro-3-nitropropionanilide.
14. N,N′-(di-n-butyl)-3-nitropropionamide.
15. 2′,5′-dimethoxy-3-nitropropionanilide.
16. N-(o-chlorobenzyl)-3-nitropropionamide.
17. N-(p-chlorobenzyl)-3-nitropropionamide.
18. 2′-methyl-3′-chloro-3-nitropropionanilide.
19. 3′,4′-dimethyl-3-nitropropionanilide.
20. 2′,5′-dimethyl-3-nitropropionanilide.
21. 2′,4′,5′-trichloro-3-nitropropionanilide.
22. N-isobutyl-3-nitropropionamide.
23. N-(n-decyl)-3-nitropropionamide.

References Cited

Boyd et al.: J. Amer. Chem. Soc., vol. 75, pp. 2762–63 (1953).

Feuer et al.: J. Org. Chem., vol. 29, pp. 939–40 (1964).

Schlesinger et al.: J. Am. Chem. Soc., vol. 78, pp. 6123–27 (1956).

Ried et al.: Ann., vol. 631, pp. 185–94 (1960).

HARRY I. MOATZ, Primary Examiner

U.S. Cl. X.R.

260—562 R, 562 P, 562 A, 544 Y; 424—324